TAG MARKING MACHINES WITH ERROR CHECKS

Filed Jan. 8, 1960 5 Sheets-Sheet 1

Inventor
Thaddeus C. Ross
By his Attorney
George C. Fuller

July 23, 1963 T. C. ROSS 3,098,606

TAG MARKING MACHINES WITH ERROR CHECKS

Filed Jan. 8, 1960 5 Sheets-Sheet 2

July 23, 1963 T. C. ROSS 3,098,606

TAG MARKING MACHINES WITH ERROR CHECKS

Filed Jan. 8, 1960 5 Sheets-Sheet 3

TAG MARKING MACHINES WITH ERROR CHECKS

Filed Jan. 8, 1960 5 Sheets-Sheet 4

July 23, 1963 T. C. ROSS 3,098,606

TAG MARKING MACHINES WITH ERROR CHECKS

Filed Jan. 8, 1960 5 Sheets-Sheet 5

United States Patent Office 3,098,606
Patented July 23, 1963

3,098,606

TAG MARKING MACHINES WITH ERROR CHECKS

Thaddeus C. Ross, Reading, Mass., assignor, by mesne assignments, to A. Kimball Company, Brooklyn, N.Y., a corporation of New York Filed Jan. 8, 1960, Ser. No. 1,288
7 Claims. (Cl. 234—33)

This invention relates to improvements in tag marking machines and more particularly to novel apparatus for detecting and manifesting marking errors. The invention is illustrated as embodied in a tag marking machine of the type disclosed in United States Letters Patent No. 2,708,873, issued May 24, 1955 on an application filed in the name of Karl J. Braun, reissued October 7, 1958, No. 24,547. It will be understood, however, that the invention in many of its novel aspects is not limited to use in machines of the type herein illustrated.

The machine disclosed in the patent is arranged for the binary marking of tags by making perforations selectively at index points arranged in columns, each column having four index points to which the values 1, 2, 4, and 7 are assigned in order of position. The machine of the patent operates under the control of a keyboard to punch holes in the index points to represent the numerals 1–9 and 0. In this four-hole code, therefore, a numeral is represented by one or two marks or holes in a column. To provide a convenient means for checking errors in punching, the illustrative machine is adapted, by means comprising an additional punch for each column, to employ a five-hole code in which an additional index point of a column is marked whenever only one mark appears in the other four points. Such a code is known as "two out of five" code. In this code, therefore, a valid code designation always contains two marks in each column.

Inasmuch as an error in the marking of a tag in such a code may denote a defect which will affect subsequent reading of the tag, it becomes highly advantageous to check the tags as soon as feasible after punching to insure that they have in fact been properly marked. It is of course possible, though infrequent, for a punch to break or become misalined whereby a particular index point of a column will no longer be properly punched and if the error is not promptly discovered many defective tags may result.

Accordingly, it is an object of the present invention to provide, in a machine of the aforesaid type, means for checking the code markings in the tags made by the machine and for manifesting an error in the event of the sensing of an improper code designation.

To this end and in accordance with a feature of the present invention, the illustrative machine is provided with sensing means past which the tags are fed after marking them with holes, the sensing means being arranged for sensing marks in the five index point positions of tag columns, and means controlled by the sensing means in accordance with the number of marks at the index points of a column for manifesting an error condition when more or less than two marks appear in the index points of a column.

More particularly, in accordance with a further feature of the present invention, the sensing means comprises a plurality of photocells operative at the sensing station for scanning the index points of tags fed past the sensing station, the operative positions of the photocells receiving light from a source on the other side of a tag when not intercepted by the tag. The cells are connected to the operating circuit comprising a logic network for providing an output error signal whenever more or less than a predetermined number of said cells is illuminated.

Tag stock is fed to the marking machine as a web of tag parts joined by two lands. In addition to punching information designations and locating holes in the tags, the illustrative machine is adapted to punch the lands between groups of tag parts, thereby forming tag units with notches at heir leadin gand trailing edges where the lands were. Such notches passing under the sensing array may permit illumination of one of the code scanning photocells in the same manner as an incorrect code designation. It is therefore desirable that error manifestation resulting from reading such notches be inhibited.

Accordingly, by a further feature of the invention, there is provided, at the sensing station, notch sensing means and means controlled by the sensing means responsively to the sensing of a notch at the sensing station to inhibit operation of the error manifesting means whereby an error will not be manifested as the result of a sensing of the notch. In the illustrative embodiment, this feature comprises a photocell mounted for cooperation with a tag at a point alined with the array and disposed beyond the index point positions but past which a slot will be moved during tag feeding, the photocell being connected with the operating circuits controlled by the other photocells to prevent the generation of an error as the result of passage of a notch past the photocell array.

Other features and advantages of the present invention will best be understood from the following description taken in conjunction with the accompanying drawings, in which.

FIGS. *6a* and *6b* together are a schematic of the sensing control error manifesting circuits of the present invention.

The illustrative machine comprises the marking machine disclosed in the aforementioned patent modified for punching data designations in the "two out of five" code and for checking the punched designations in accordance with a feature of the present invention. In addition, the two cut-off punches make a rectangular instead of a round hole. Only so much of the basic machine will be discussed herein as is necessary to an understanding of the present invention. For a more complete description of the marking machine reference may be had to the aforementioned patent.

Figures 1, 2:
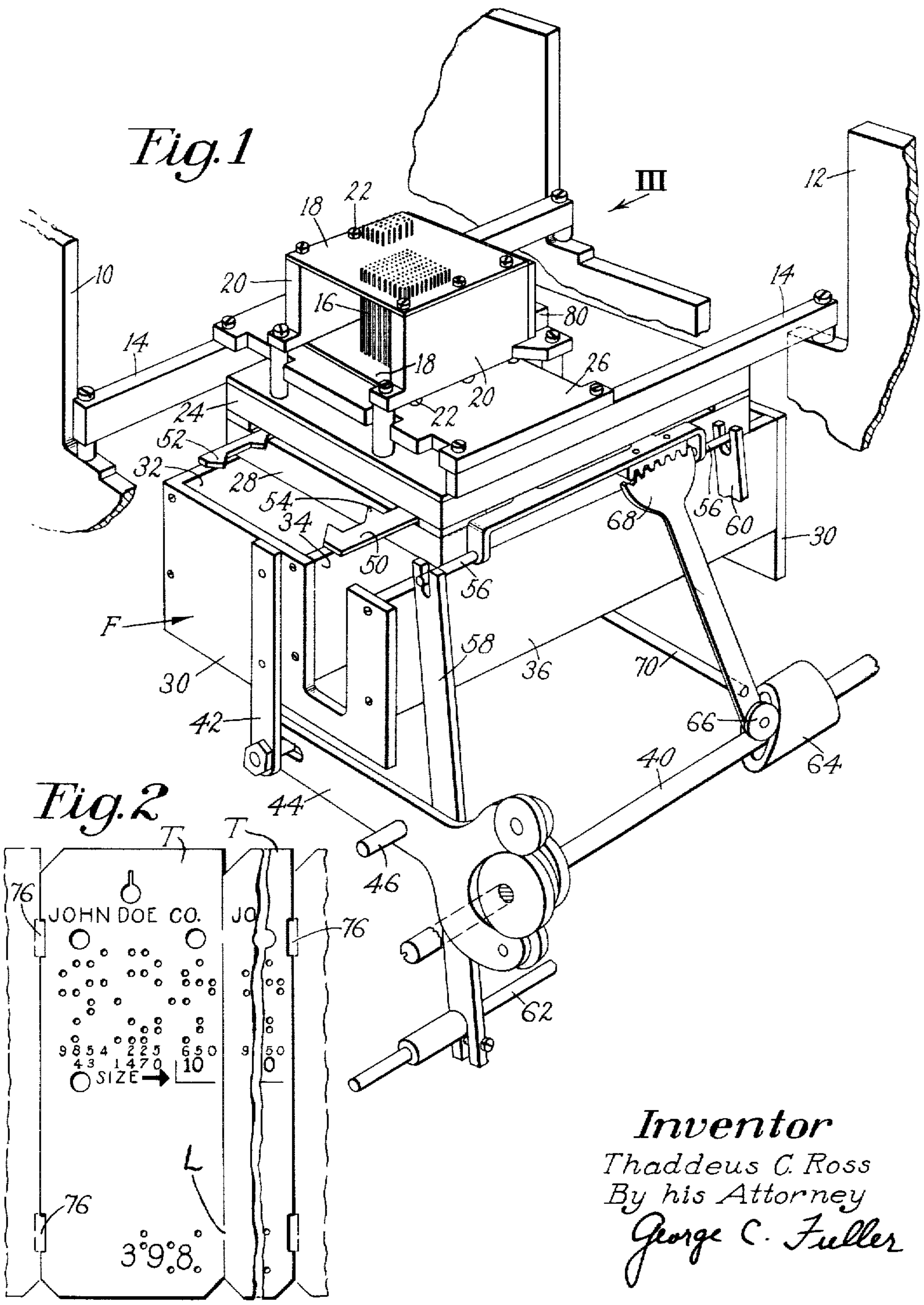
FIG. 1 is a perspective view showing particularly the punch mechanism and tag feeding mechanism of a marking machine embodying the present invention.
FIG. 2 is a face view of a multi-part garment tag as it will appear after being punched and printed with information in the "two out of five" code employed by the illustrative apparatus.
Figure 3:
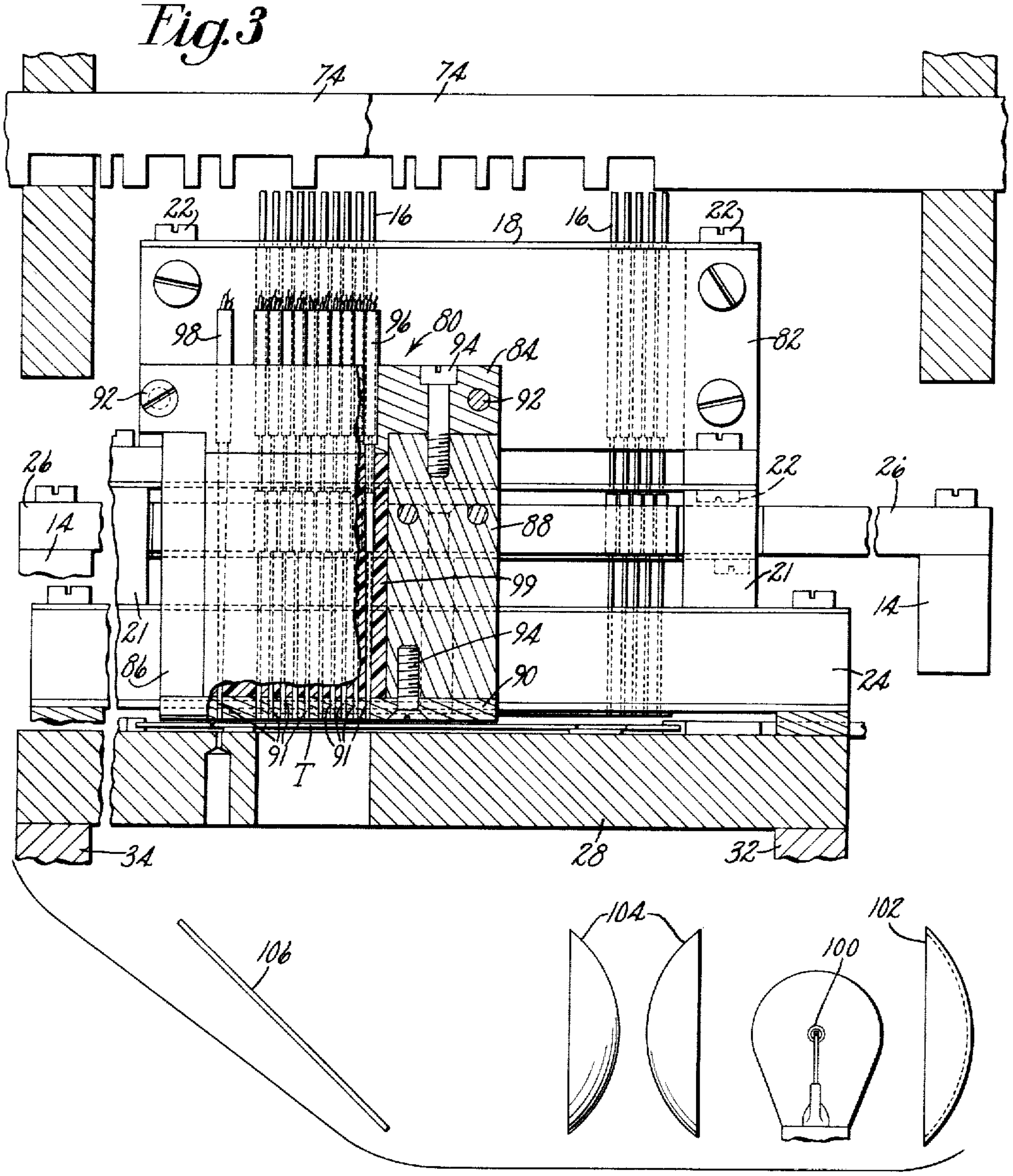
FIG. 3 is an enlarged side elevation, partly in section, viewed in the direction of the arrow III of FIG. 1.
Figure 4:
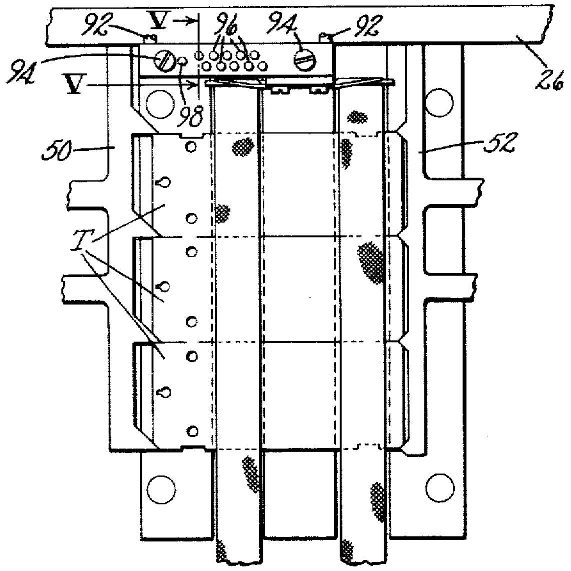
FIG. 4 is a plan view of a portion of the mechanism shown in FIG. 1.

Referring to the drawings, FIG. 1, which corresponds to FIG. 21, of the patent, shows the tag feeding and punch mechanism of the tag marking machine. Briefly, the frame of the illustrative machine comprises a left-hand side plate 10 and a right-hand side plate 12 on which are supported a pair of cross bars 14.

Two groups of pins 16 are mounted for axial movement between a pair of horizontal plates 18 fastened to a pair of vertical plates 20, by screws 22. The plates 20 are supported by spacers 21 attached to a punch block 24. Mounted between the bottom plate 18 and the punch block 24 is a stationary plate 26 which is carried by the aforesaid cross bars 14.

The punch block 24 is supported by and spaced from a bed plate 28 which in turn is carried by a box-like frame F comprising two end walls 30 and three transverse walls 32, 34 and 36.

A main drive shaft 40 is arranged, as shown in FIG. 18 of the patent, to be driven by an electric motor M (FIG. 6*b*) through a clutch. At each end of the frame F, a slide 42 is connected to the main shaft 40 through a bifurcated lever 44 pivoted on a stud 46 and a cam 48 to provide for positively raising and lowering for each revolution of the main shaft 40, the punch block 24 and the pin frame 18–20.

Also moving with these elements is a pair of claw-like feeding bars 50, 52 having spaced teeth 54 and which are moved toward and from each other fore and aft of the machine and reciprocated in unison transversely of the machine, when feeding tags T through the machine. The tag feeding bars 50, 52 are provided with stub shafts 56 which slidably fit within the slots in the upper end of a pair of levers 58 and 60, which levers are pivotally supported at their lower end by a cross shaft 62 mounted in the side plates 10 and 12. The levers 58 and 60 are interconnected as described in the patent with levers on the other side of the frame F and connected to the feed bar 52 so that when the levers are rocked on their pivot shafts the feed bars 50 and 52 are moved toward and from each other. The levers are connected as described in the patent for operation by a cam on the main shaft 40 so that during each revolution of the shaft the feeding bars 50—52 will be caused to move towards each other to engage and feed the tag parts T and then be moved away from each other to disengage the tags.

The feeding or transverse movement of the feeding bars is provided by connections which simultaneously move the bars transversely of the machine. For this purpose a cam 64 fast on the main shaft 40 drives a roller 66 which is rotatably carried by the lower end of a gear segment 68 which segment is fast on one end of a longitudinal shaft 70. Teeth on the gear segment 68 mesh with a rack 72 fixed to the feeding bar 50. A similar arrangement is provided for the feeding bar 52.

As disclosed in the aforesaid patent, upward movement of the frame and punch block effects punching of the tags in accordance with the setting of gag bars 74 as established on a keyboard. After punching, a typical tag resembles that disclosed in FIG. 2, which illustrates a multi-part tag comprising a plurality of tag parts T connected by two lands L and abutting along a line between spaced feeding notches, the multi-part tags comprising a group, or tag unit of connected tag parts. These units are severed from one another, previous to printing and data punching, by punches which operate to remove the lands between the tag units of the original web leaving notches 76 at the edges of the tag units. It will be observed that the lower portion of the upper notches 76 is in line with the upper row of holes in the data field. This creates a problem in connection with optical checking which will be discussed hereinafter.

Figure 5:
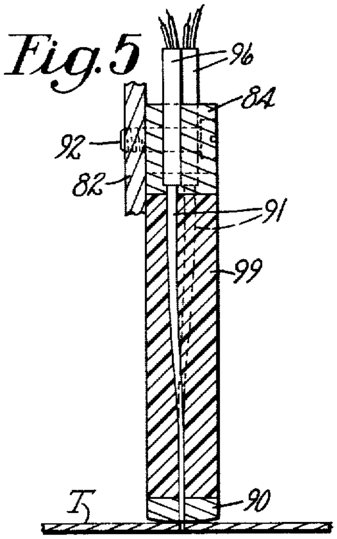
FIG. 5 is a greatly enlarged section taken on line V—V of FIG. 4.

To the end of sensing the data designations in the upper field immediately after the punching operation to insure that no punched column contains more or less than two holes, a sensing pickup 80 is secured to a plate 82 extending between the vertical plates 20 on the side of the punch block where the tags emerge after being punched. The sensing pickup 80 comprises an upper member 84, side members 86 and 88, and a bottom member 90, which are screwed together leaving a central opening or window, the pickup being secured to the plate 82 by screws 92, while the members are joined by screws 94. The upper member 84 is formed with a plurality of vertical holes each of which contains a photoelectric cell 96, while the lower member 90 is formed with a corresponding plurality of holes alined to correspond with the index points in the data field of the tag. The photocells are optically connected to the holes in the lower member 90 by light transmitting plastic rods 91 extending from the photocells and through the holes in the member 90 flush with its bottom surface. An additional guard photocell 98 is similarly mounted and connected to a hole in the member 90 alined with the other holes but in a position to sense the upper portion of the notch 76. The plastic rods suitably are plotted with a plastic 99 which fills the window area as indicated in FIG. 5, although this is not essential. In the bed plate 28 opposite the sensing array comprising the tips of the plastic rods, a hole is formed to provide a path for light from a source shown diagrammatically as comprising a lamp 100, reflector 102, condensing lenses 104, and mirror 106. A similar hole is formed in the plate 28 opposite the sensing tip of photocell 98.

Figure 6A:
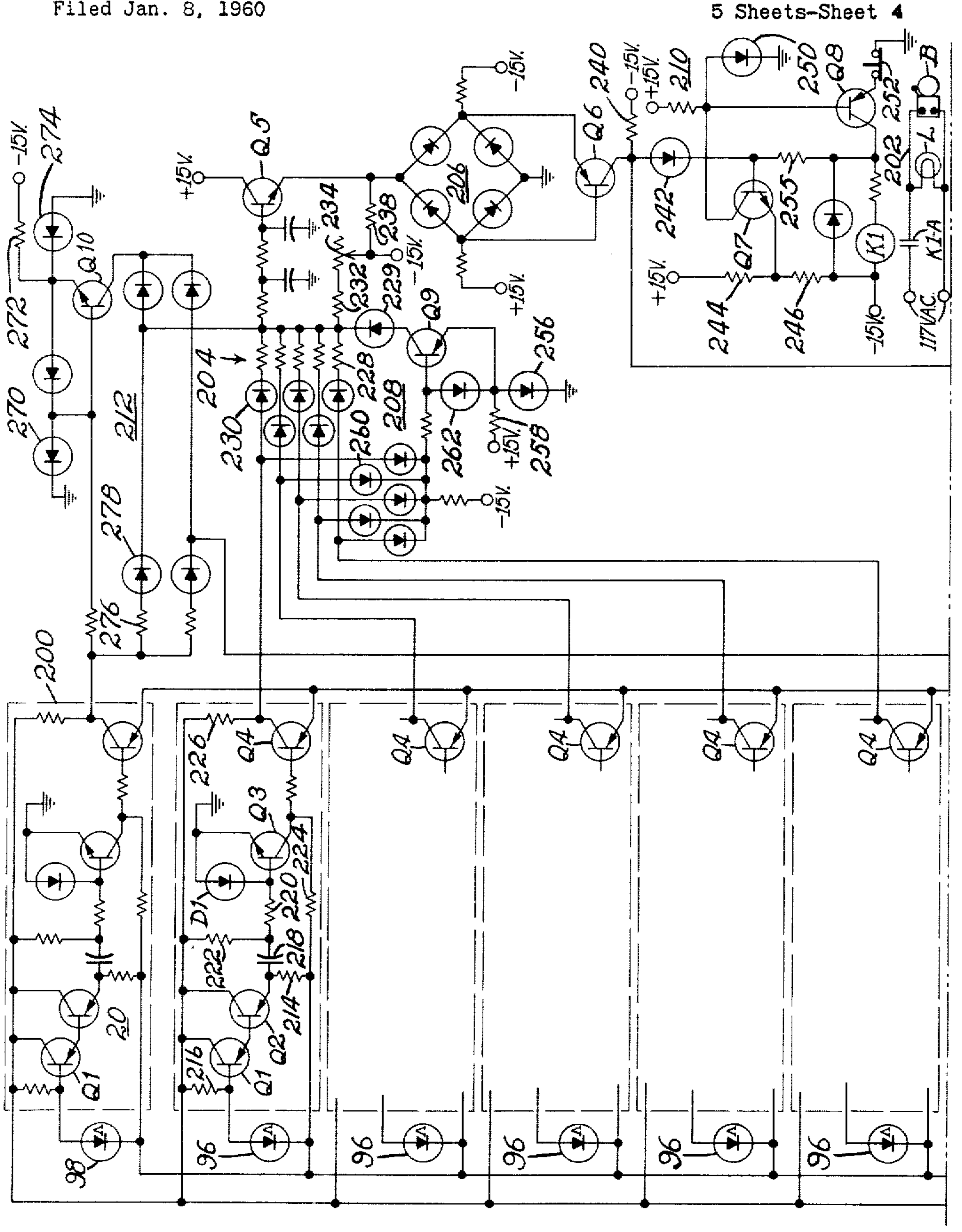
Figure 6B:
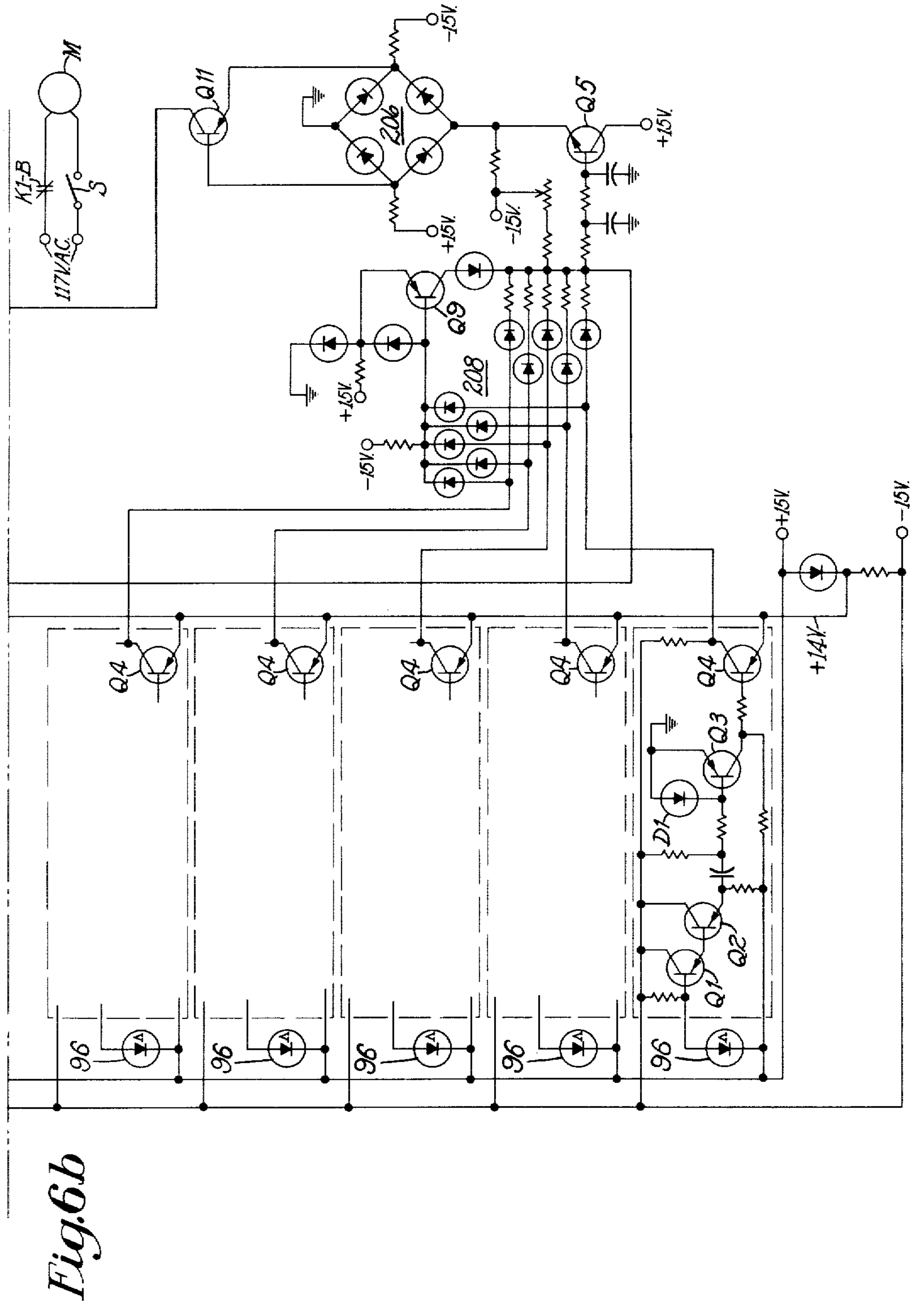

Referring now to FIGS. 6*a* and 6*b*, which viewed edge to edge comprise a schematic of the sensing, operating and indicating circuits, it will be observed that at the left side of each figure a plurality of photocells 96, 98 are arrayed heightwise substantially in the order in which they are arranged in the sensing pickup 80. Each of the photocells 96, 98 is connected to a sensing amplifier 200 outlined in a dashed box. The outputs of these amplifiers are connected in an operating circuit which may be considered as comprising the rest of the schematic except for the indicating circuit 202 comprising the contacts K1–A and K1–B of a relay K1 and the devices controlled thereby.

As an introductory to understanding the schematic, it will be understood that the output of the sensing amplifiers is about −15 v. when the photocell is dark and rises as a rectangular pulse to about +14 v. when light falls on the cell. The amplifiers for the photocells 96 are connected to a summing network 204 which provides an output to an error bridge 206 and which, except for a blank column inhibitor circuit 208, is above or below ground unless exactly two of the five outputs are positive. In this case, the output to the bridge 206 is at ground and the output voltage of the bridge is zero. Otherwise the bridge has an output effective to cause operation of a relay operating circuit 210. The blank column error inhibitor circuit 208 operates, as hereinafter explained, in greater detail to prevent an error signal to the error bridge 206 when none of the photocells are illuminated.

The output of the sensing amplifier for the photocell 98 is employed to inhibit an error signal which would otherwise result from the trailing edge of the tag run or the notches 76 between adjacent tag units. Otherwise the notches 76 on being sensed by the upper photocell 96 produce an error signal in the same manner as would a single punch mark in the number one index point of a column.

To this end, illumination of the guard photocell 98 controls an inhibiting circuit 212 to maintain the output of the summing network 204 at ground, to prevent an output from the error bridge 206.

More particularly, each of the photocells 96, 98 which suitably may be, for example, 1N77B (Sylvania), is connected to a sensing amplifier 200. The amplifier 200 comprises a two-stage emitter follower amplifier comprising two germanium PNP transistors (2N270) Q1 and Q2, the transistor Q2 having connected between the negative supply line and its emitter a load resistor 214. When the photocell 96 is dark and not conducting, the base of Q1 is biased negative with respect to its emitter by its connection of the negative supply line through resistor 216. Accordingly, Q1 and Q2 are therefore biased conductive and the upper end of the resistor 214 is substantialy at −15 v. When the photocell 96 is illuminated, the transistors Q1 and Q2 become less conductive and the voltage at the upper end of the resistor 214 swings positive.

The voltage swing is transmitted by a coupling capacitor 218 and converted into current flow through a coupling resistor 220. This resistor is effectively in series with the parallel combination of the base to emitter junction of a transistor Q3 and an external germanium diode D1. The diode D1 operates to recharge the capacitor 218 during negative voltage swings and to clamp the base voltage near ground to prevent excessive reverse bias supplied from the negative line through the resistor 222 from appearing across the base to emitter junction. The resistor 222 is provided to keep a measure of reverse bias on the junction to keep Q3 non-conductive in the absence of voltage pulses at the output of Q2. The collector of Q3, which is connected to the positive supply line through a load resistor 224, is accordingly 0 v. or +15 v. respectively, depending on whether a pulse is being received from the photocell or not. An output transistor Q4 has its emitter connected to the +14 v. supply line and its collector connected to the negative supply line through a load resistor 226. When the output of the collector of Q3 is +15 v., Q4 is biased off and its collector voltage is then −15 v. When the collector of Q3 swings to 0 v., Q4 is biased on and its collector voltage is +14 v. Accordingly, the output or collector voltage of Q4 is +15 v. when the photocell is generating a pulse and −15 v. when the photocell is dark. The output of each group of five sensing amplifiers 200 is supplied to a summing network comprising five adding resistors 228 of equal value, each coupled at one terminal through a diode 230 to one of the amplifiers, while the other terminals are connected to a common summing resistance made up of a fixed resistor 232 and an adjustable resistor 234 connected to the negative terminal of the power supply.

Accordingly, the voltage across the summing resistance is a function of the number of adder resistors conducting. These conduct only when the voltage output of their amplifiers is +15 v. The values are so chosen that when any two adding resistors 228 are conducting, the voltage drop across the summing resistance is +15 v. so that the junction is at 0 v., i.e. ground.

An emitter follower NPN transistor Q5 establishes at its emitter the voltage which appears at the base while providing a low impedance output at the junction of its emitter load resistor 238. The emitter is connected to the diode error bridge 206 which is referenced to ground to provide an output voltage if the voltage at the emitter is other than 0 v. An unbalance of the error bridge results in emitter curernt in the normally cut-off transistor Q6 causing a voltage drop to appear across the load resistor 240 of its collector. The resulting voltage appearing at the collector Q6 is transmitted, via a diode 242 to the base of a transistor Q7 which is biased to about −7 v., by connection of its emitter to the junction of two resistors 244, 246 connected between −15 v. and +15 v. terminals against conduction when Q6 is cut off.

An output transistor Q8 is biased to cut-off when Q7 is not conducting by the connection of its base to the junction of a resistor 248 connected to the positive supply terminal and a diode 250, the resistor and diode forming a series connection between +15 v. and ground whereby a fractional voltage reverse bias is provided by the forward voltage drop of the diode since the emitter of Q8 is grounded through a clear switch 252.

When Q7 conducts, the reverse bias is overcome and the base of Q8 is forward biased by the collector current of Q7 permitting current to flow through Q8 and operate a relay K1 having a quench diode 254 connected in parallel with its coil to prevent excessive negative voltage swings from appearing at the collector of Q8.

The collector voltage of Q8 is transmitted to the base of Q7 by a resistor 255 thereby locking the transistors Q7 and Q8 in a conductive state until cleared by operation of the switch 252. Energization of relay K1 closes the contacts K1–A to energize the indicating circuit comprising such error manifest devices as signal light L and buzzer B. If desired, of course, by means of appropriate arrangements, including the normally closed contacts K1–B in the motor circuit, the marking machine may be caused to stop its tag marking operation upon energization of the relay K1, thus indicating an error.

The blank column inhibitor circuit 208 is provided to prevent operation when none of the photocells 96 are illuminated and operates to disable the error circuit by supplying an artificial "correct" volt level across the summing resistance when no photocells are illuminated. This is done by making a transistor Q9 conduct at all times except when at least one of the photocells is illuminated so that the high level (+14 v.) appears at the output of its amplifier. To this end the emitter of Q9 is clamped to +0.6 v. by its connection to the junction of a diode 256 and a resistor 258 connected to the +15 v. supply so that when no photocell is illuminated and none of the "or" diodes 260 is conducting, there is emitter current in Q9 and it conducts collector current through the series diode 229 giving rise to a total voltage drop across Q9 and diode 229 of 0.6 volt approximately to establish a 0 v. level at the base of Q5, thus satisfying the condition for no error indication. If any of the diodes 260 conduct as a result of illumination of a corresponding photocell 96, the voltage at the output of the "or" gate is +15 v. and the voltage at the base of Q9 becomes about +1 v. because of a diode 262 and the transistor Q9 is cut off, the emitter of Q9 remaining at +0.6 v.

To avoid indicating an error, as the result of the trailing edge of a run of tags passing the sensing pickup or the sensing of a notch 76 by the upper photocell 96, upon sensing a notch or tag edge by illumination of the photocell 98, the output of the sensing amplifier rises to about +14 v. and current flows through a resistor and a clamping diode 270 to ground, raising the base of transistor Q10 to a fraction of a volt above ground. Since the emitter of Q10 is biased about ½ v. below ground by its connection to the bias network comprising a resistor 272 and diode 274, the transistor Q10 is biased "on" ready to conduct when its collector voltage rises above the emitter voltage. This will happen when the summing resistance voltage is sufficiently above ground to give an error indication, which will happen in the case of a tag edge. The conducting transistor Q10 will then clamp the summing resistance voltage to a level below its error signal value. If, on the other hand, a negative error signal is generated in response to the passage of a notch which looks like one hole in a column, the notch is also sensed by the guard photocell 98 and the positive output of its amplifier is supplied to the summing resistance via resistor 276 and a diode 278. Since the transistor Q10 is prepared to conduct as previously described, the voltage at the summing resistance will rise only to the clamp level established by the conducting transistor Q10.

Inasmuch as the data designation field of the tag, as shown in FIG. 2, comprises 24 columns arranged in two rows of 12 columns, there are 10 index points alined heightwise of the tag or transversely of the feed path and accordingly 10 photocells 56 are provided to scan the 10 index points. The five photocells provided for scanning the lower row of columns and their associated circuits are shown in FIG. 6*b*, but since the circuit is similar to that shown in FIG. 6*a*, no further discussion of the circuit is needed other than to point out that the error output from its output transistor Q11 is supplied to the same point as the collector output of transistor Q6.

In operation, after the motor M is started by closing switch S, a continuous web of tag parts is supplied to the marking machine where the feed mechanism operates intermittently to move the web first to punch notches 76 to cut the continuous web into tag units, as indicated in FIG. 2, and then to convey the tag units still in abutted relation to the punching station where they are marked with data designations in the form of holes at index positions of the columns. The tags are then fed past the sensing pickup and as they pass, the pickup holes in the index points permit light to enter the photocells which then control the indicating devices to manifest an error should a defect in the punching operation occur. Obviously, the marking of the index points of a tag may be done by means other than making holes. For example, spots of black ink adapted to be sensed by appropriate photocell device or conductive ink adapted to be sensed by conductivity sensing devices could be employed. Accordingly, it is not intended that the invention be deemed limited to the checking of errors of data designations marked by punching holes in a card.

Having thus described my invention, what I claim as new and desire to secure by Letters Patent of the United States is:

1. In a marking machine having means for feeding tag parts through a marking station, and means operative at said station for marking said tag parts by punching them in a plurality of columns of index points with data designations, each valid designation being represented by a predetermined number of holes in a column, said columns being disposed transverse of the feed path of corresponding index points of adjacent columns alined with said path, in combination therewith, a source of light arranged to illuminate marked tags carried by said feed means, a plurality of photocells corresponding in number to the index points of a column and operative at points disposed in an array at the other side of the tags for sensing holes at each index point of a given column, indicating means, means controlled by said photocells in response to the sensing of a marked column having other than said predetermined number of holes for operating said indicating means to manifest an error, and an additional guard photocell operative at a point alined with said array for response to illumination at a point spaced from the index points of the column and circuit means controlled by said photocell in response to illumination thereof for preventing operation of the indicating means whereby the end of a tag run or a cut-off notch at the side of a tag will not result in the manifestation of an error.

2. In a marking machine having means for feeding tag parts through a marking station, and means operative at said station for marking said tag parts by punching them in a plurality of columns of index points with data designations, each valid designation being represented by a predetermined number of holes in a column, said columns being disposed transverse of the feed path of corresponding index points of adjacent columns alined with said path, a source of light arranged to illuminate marked tags carried by said feed means, a plurality of photocells corresponding in number to the index points of a column and operative at points disposed in an array at the other side of the tags for sensing holes at each index point of a given column, means controlled by said photocells in response to the sensing of a column for generating an error signal voltage where said column contains other than said predetermined number of holes, means cooperating with said error voltage generating means to prevent the generation of an error voltage when an unmarked column is being sensed, and means controlled by said error voltage for manifesting errors.

3. In a marking machine having means for feeding tag parts through a marking station, and means operative at said station for marking said tag parts by punching them in a plurality of columns of index points with data designations, each valid designation being represented by a predetermined number of holes in a column, said columns being disposed transverse of the feed path of corresponding index points of adjacent columns alined with said path, a source of light arranged to illuminate marked tags carried by said feed means, a plurality of photocells corresponding in number to the index points of a column and operative at points disposed in an array transverse of said path at the other side of the tags for sensing holes at each index point of a given column, means controlled by said photocells in response to the sensing of a marked column for generating an error signal voltage where said column contains other than said predetermined number of holes, means cooperating with said error voltage generating means to prevent the generation of an error voltage when no mark is being sensed, means controlled by said error voltage genearting means for terminating the operation of the marking means, a guard photocell operative at a point aligned with said array, and means controlled by said guard photocell in response to illumination thereof for inhibiting the effective generation of an error signal voltage by said error voltage generating means.

4. In apparatus for checking a record member marked at parallel columns of index points with data designations in a code requiring that a valid designation have a predetermined number of marks in a column, said predetermined number being greater than one, in combination, means for feeding said record member through a sensing station, sensing means disposed in relation to said feeding means for sensing the designations marked in said columns, indicating means, means controlled by said sensing means in response to the sensing of a column having a number of marks different from, whether greater or lesser than, said predetermined number of marks for operating said indicating means for manifesting an error, and means controlled by said sensing means for inhibiting the operation of said indicating means when an unmarked column is sensed.

5. The combination according to claim 4, said predetermined number of marks being two.

6. In apparatus for checking tags marked with data designations by punching holes therein at index points arranged in columns, each valid designation being represented by a predetermined number of holes in a column, means for feeding tags through a sensing station, a source of light arranged to illuminate tags carried by said feeding means, a plurality of photocells corresponding in number to the index points of a column and operative at points disposed in an array at the other side of the tags for sensing holes at each index point of a given column, indicating means, means controlled by said photocells in response to the sensing of a marked column having other than said predetermined number of holes for operating said indicating means to manifest an error, and an additional guard photocell operative at a point alined with said array for response to illumination at a point spaced from the index points of the column and circuit means controlled by said photocell in response to illumination thereof for preventing operation of the indicating means whereby the end of a tag run or a cut-off notch at the side of a tag will not result in the manifestation of an error.

7. In apparatus for checking a record member marked with data designations by punching holes therein at index points arranged in columns, each valid designation being represented by a predetermined number of holes in a column, means for feeding said record member through a sensing station, a source of light arranged at said station to illuminate said record member carried by said feeding means, a plurality of photocells corresponding in number to the index points of a column and operative at points disposed in an array at the other side of the record member for sensing holes at each index point of a given column, an amplifier connected to each photocell, a summing network comprising a plurality of adding resistors, each coupled at one terminal through a diode to one of the ampliifiers, and a summing resistance connected at a common junction to the other terminals of the adding resistors for carrying their combined currents, an error bridge controlled by the voltage at said junction to provide an error signal when more or less than a predetermined number of adding resistors are conducting, a blank column inhibitor circuit controlled by the photocell amplifiers through an "or" gate to supply current to maintain the voltage at said junction at the "correct" level when no photocells are illuminated, and an error indicating means controlled by the output of the error bridge.

References Cited in the file of this patent

UNITED STATES PATENTS

| | | |
|---|---|---|
| 2,275,396 | Johnson | Mar. 3, 1942 |
| 2,382,251 | Parker et al. | Aug. 14, 1945 |
| 2,609,433 | Goff | Sept. 2, 1952 |
| 2,838,115 | Davis | June 10, 1958 |

UNITED STATES PATENT OFFICE

CERTIFICATE OF CORRECTION

Patent No. 3,098,606 July 23, 1963

Thaddeus C. Ross

It is hereby certified that error appears in the above numbered patent requiring correction and that the said Letters Patent should read as corrected below.

Column 2, line 14, for "heir leadin gand" read -- their leading and --; line 33, after "error" insert -- signal --; column 4, line 23, for "plotted" read -- potted --; line 73, after "98" insert a comma; column 5, line 7, for "of" read -- to --; lines 9 and 10, for "substantialy" read -- substantially --; line 62, for "curernt" read -- current --; column 8, line 23, for "genearting" read -- generating --.

Signed and sealed this 25th day of February 1964.

(SEAL)
Attest:
ERNEST W. SWIDER

Attesting Officer

EDWIN L. REYNOLDS

Acting Commissioner of Patents